US005349670A

United States Patent [19]
Agrawal et al.

[11] Patent Number: 5,349,670
[45] Date of Patent: Sep. 20, 1994

[54] INTEGRATED CIRCUIT PROGRAMMABLE SEQUENCING ELEMENT APPARATUS

[75] Inventors: Om P. Agrawal, San Jose; Arthur H. Khu, San Mateo; Kapil Shankar, San Jose, all of Calif.

[73] Assignee: Advanced Micro Devices, Inc., Sunnyvale, Calif.

[21] Appl. No.: 149,029

[22] Filed: Nov. 8, 1993

Related U.S. Application Data

[63] Continuation of Ser. No. 819,603, Jan. 9, 1992, abandoned, which is a continuation of Ser. No. 320,869, Mar. 7, 1989, abandoned, which is a continuation of Ser. No. 889,453, Jul. 23, 1986, abandoned.

[51] Int. Cl.$^5$ .............................................. G06F 9/00
[52] U.S. Cl. .................................. 395/775; 395/400; 364/716; 364/244.6; 364/244.9; 364/261.3; 364/262.4; 364/DIG. 2
[58] Field of Search .................... 395/375, 775, 400; 364/716

[56] References Cited

U.S. PATENT DOCUMENTS

| | | | |
|---|---|---|---|
| Re. 32,858 | 2/1989 | Blahut et al. | 364/716 |
| 3,878,514 | 4/1975 | Faber | 364/200 |
| 3,978,454 | 8/1976 | Willard | 395/775 |
| 3,982,230 | 9/1976 | Burkett et al. | 364/900 |
| 4,037,089 | 7/1977 | Horninger | 364/900 |
| 4,153,933 | 5/1979 | Blume, Jr. et al. | 364/200 |
| 4,387,447 | 6/1983 | Klass et al. | 365/203 |
| 4,415,818 | 11/1983 | Ogawa et al. | 340/825.83 |
| 4,471,461 | 9/1984 | Bonne | 364/900 |
| 4,502,112 | 2/1985 | Fujiwara | 364/200 |
| 4,617,479 | 10/1986 | Hartmann et al. | 340/825.83 |
| 4,675,843 | 6/1987 | Vautier | 364/900 |
| 4,717,912 | 1/1988 | Harvey et al. | 364/825.83 |
| 4,755,967 | 7/1988 | Gabris | 364/900 |
| 4,774,421 | 9/1988 | Hartmann et al. | 307/465 |
| 4,831,573 | 5/1989 | Norman | 364/716 |
| 4,868,735 | 9/1989 | Moller et al. | 364/200 |
| 4,876,640 | 10/1989 | Shankar et al. | 364/716 |
| 4,963,768 | 10/1990 | Agrawal et al. | 307/465 |

OTHER PUBLICATIONS

"Newbreed of Semiconductor Products", by John Mudge Semiconductor Division, Electron. Prog. (USA), vol. 19, No. 3, (Fall 1977), pp. 6–9.
*Programmable Array Logic Handbook*, by Advanced Micro Devices, Inc., copyright 1984, pp. 2-35-2-46.

*Primary Examiner*—Parshotam S. Lall
*Assistant Examiner*—Ayni Mohamed
*Attorney, Agent, or Firm*—Fliesler, Dubb, Meyer & Lovejoy

[57] ABSTRACT

An integrated circuit programmable sequencing element apparatus on a single chip is provided which includes a PROM including first signal receiving circuitry and second signal providing circuitry; at least one feedback signal providing circuitry responsive to at least one second signal for providing at least one feedback signal; at least one input signal providing circuitry for providing at least one input signal; at least one control signal providing circuitry for providing at least one control signal; at least one programmable sequencing element circuitry for receiving said at least one control signal and the at least one input signal and for providing at least one programmable sequencing element signal; and selection circuitry for selecting at least between the at least one programmable sequencing element signal and the at least one feedback signal and for providing at least one selected signal to the first signal receiving circuitry.

28 Claims, 5 Drawing Sheets

INTEGRATED CIRCUIT PROGRAMMABLE SEQUENCING ELEMENT APPARATUS

This application is a continuation of Ser. No. 07/819,603, filed Jan. 9, 1992, now abandoned, which is a continuation of Ser. No. 07/320,869, filed Mar. 7, 1989, now abandoned, which is a continuation of Ser. No. 06/889,453, filed Jul. 23, 1986, now abandoned.

BACKGROUND OF THE INVENTION

1. Field of the Invention

The present invention relates generally to integrated circuit electronic devices on a single chip and more particularly to programmable sequencing elements.

2. Description of the Related Art

Programmable sequencing elements comprise a family of devices which share a similar basic logic architecture. The block diagram of FIG. 1 illustrates this basic architecture. The architecture includes an AND-array which receives input signals, performs AND logic functions using the input signals and provides AND function signals as outputs. It also includes an OR-array, which receives the AND function signals from the AND-array, performs OR logic functions using the AND function signals and provides AND-OR signals as outputs. This basic architecture is useful in implementing Boolean sum-of-products type algebra.

The programmable sequencing elements include programmable read only memories (PROMs), programmable array logic devices and programmable logic arrays (PLAs). PROM architecture includes a fixed AND-array and a programmable OR-array. Programmable array logic devices include a fixed OR-array and a programmable AND-array. PLAs include a programmable AND-array and a programmable OR-array.

A typical PROM comprising n input terminals for receiving n binary input signals, usually includes $2^n$ AND gates in its AND-array. A respective AND gate ordinarily corresponds to each possible combination of binary signals provided to the n input terminals. Thus, input signals provided to a PROM are fully decoded in that each possible combination of input signals provided to the PROM corresponds to a particular AND gate of the AND-array. The OR-array, therefore, can be programmed to store a distinct combination of binary data for every possible combination of binary input signals.

Programmable array logic devices, unlike PROMs, are not restricted by the requirement that there be $2^n$ AND gates for n input terminals. A typical earlier programmable array logic device is disclosed in U.S. Pat. No. 4,124,899 issued to Birkner et al on Nov. 7, 1978. A programmable array logic device, therefore, ordinarily can include more input signal terminals than it has AND gates. Unfortunately, however, some possible combinations of binary input signals provided to the input terminals of a typical programmable array logic device are unaccounted for in that they do not correspond to particular output signals provided by the device.

PLAs, while featuring many of the advantages of both PROMs and programmable array logic devices, suffer from an important disadvantage. Typical PLAs are described in *Handbook of Semiconductor and Bubble Memories* by Walter A. Triebel and Alfred E. Chu copyright 1983 by Prentice-Hall, Inc., pages 220–257. Typically they are much slower than the other types of programmable sequencing elements, and therefore, ordinarily are not suitable for high-speed environments.

One important performance goal for programmable sequencing elements has been flexibility of operation. For example, one prior U.S. patent application owned by the assignee in common with the present application, entitled APPARATUS FOR PRODUCING ANY ONE OF A PLURALITY OF SIGNALS AT A SINGLE OUTPUT, Ser. No. 433,253, now U.S. Pat. No. 4,717,912 filing date Oct. 7, 1982 addresses one way in which the configuration of input/output ports may be made more flexible. Moreover, another prior U.S. patent application entitled DYNAMICALLY CONTROLLABLE OUTPUT LOGIC CIRCUIT, Ser. No. 656,109, now abandoned, filing date Sep. 20, 1984 addresses an output logic circuit for controlling the configuration of an output which allows for dynamic control of the configuration and increases the flexibility of design for the user of the invention.

While these earlier programmable sequencing elements generally have been successful, there have been shortcomings with their use. For example, since PROMs usually decoded substantially every possible binary input signal combination provided to their input terminals, each respective binary input signal combination corresponded to a respective AND gate coupled to the PROM OR-array. As a result, only one test condition ordinarily could be tested per cycle of the PROM, and the state machine, therefore, could not perform multiple branching. That is, the state machine could not transition from one state to any one of two or more other states based upon multiple test conditions. Thus, such earlier state machines often required a larger number of cycles than was desirable in order to achieve a transition between states involving multiple test conditions.

Therefore, although earlier PROMs offered some advantage over typical programmable array logic devices by fully decoding all possible binary input signal combinations and over prior PLAs due to superior speed, such earlier PROMs suffered shortcomings due to their fixed input and output terminal structures and due to the fixed nature of the output signals provided by those terminals. Furthermore, prior PROMs often were inefficient in the implementation of flexible state machines.

Thus, there exists a need for an apparatus in which a PROM can implement a state machine capable of testing multiple test conditions during each PROM cycle, and which is capable of flexible multiple branching from one state to any one of at least two other states. The present invention meets this need.

SUMMARY OF THE INVENTION

The present invention comprises an integrated circuit programmable sequencing element apparatus on a single chip. The apparatus comprises a PROM including single receiving terminals and signal providing terminals. The apparatus includes feedback circuitry for providing feedback signals in response to signals provided on the signal providing terminals. Circuitry also is included for receiving input signals, and control circuitry is included for providing control signals. At least one programmable sequencing element is included for receiving the input signals and the control signals and for providing programmable sequencing element signals. Selection circuitry is provided for selecting between at least the programmable sequencing element signals and the feedback signals.

In another aspect, the present invention comprises an integrated circuit programmable sequencing apparatus on a single chip comprising a PROM including signal receiving terminals and signal providing terminals. The apparatus includes first feedback circuitry for providing first feedback signals in response to first signals provided on the signal providing terminals, and it further includes second feedback circuitry for providing second feedback signals in response to second signals provided by the signal providing terminals. Control circuitry is included for providing control signals, and input circuitry is included for providing input signals. At least one programmable sequencing element is included for receiving control signals and input signals and for providing programmable sequencing element signals. Selection circuitry responsive to programmable sequencing element signals is included for selecting between the first and the second feedback signals and for providing selected signals to at least one signal receiving terminal.

In a still other aspect, the invention comprises a method for branching to at least one of multiple address locations of a PROM. The method comprises a step of providing at least N signals provided to a programmable sequencing element, where $2^n$ equals a total number of address locations of the PROM, and $N>n$. The method further includes a step of receiving at least one signal from the programmable sequencing element.

These and other features and advantages of the present invention will become more apparent from the following detailed description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DESCRIPTION OF THE PREFERRED EMBODIMENTS

The present invention comprises a novel integrated circuit programmable sequencing element apparatus on a single chip and an associated method. The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 2:
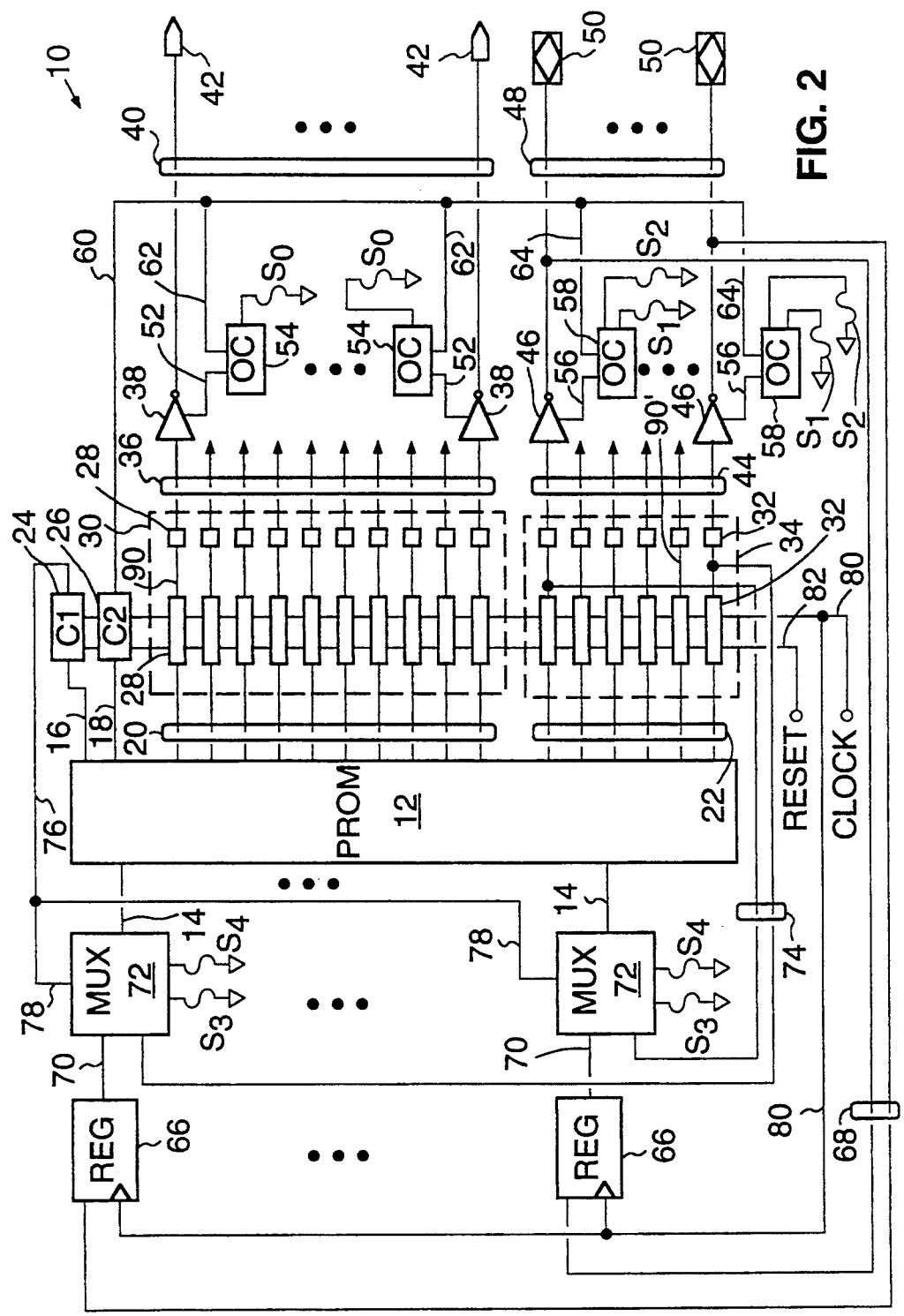
FIG. 2 is a block diagram of a first embodiment of the present invention.

Referring to the illustrative drawings of FIG. 2, there is shown a first embodiment 10 of an integrated circuit programmable sequencing element apparatus of the present invention. The first embodiment 10 includes a $64 \times 18$ PROM 12 including six input terminal lines 14 (only two of which are shown) and including eighteen output terminal lines 16, 18, 20 and 22. Of course, a PROM with different dimensions can be provided without departing from the scope of the invention. Output line 16 is coupled to first control register 24. Output line 18 is coupled to second control register 26. Ten respective output lines 20 are coupled to ten respective first macrocell units indicated by a common reference numeral 28 shown within dashed lines 30. Six respective output lines 22 are coupled to six respective second macrocells units indicated by a common reference numeral 32 and shown within dashed lines 34.

The ten respective first macrocell units 28 are coupled by ten respective lines 36 to ten first output buffer circuits 38 (only two of which are shown). The ten first output buffer circuits 38 are coupled by ten respective lines 40 (only two of which are shown) to ten respective first terminals 42.

The six second macrocell units 32 are coupled by six respective lines 44 to six second output buffer circuits 46 (only two of which are shown). The six second output buffer circuits 46 are coupled by respective lines 48 (only two of which are shown) to six respective second terminals 50.

Each of the ten first output buffer circuits 38 is coupled by a respective line 52 to a respective output control circuit 54. Only two of the ten first output control circuits 54 are shown in the drawing. Each first output control circuit 54 includes a programmable fuse link labelled $s_0$ coupled thereto.

Each of the six second output buffer circuits 46 is coupled by a respective line 56 to a respective second output control circuit 58. Only two of the six second output control circuits 58 are shown in the drawing. Each second output control circuit 58 is coupled to two programmable fuse links labelled respectively as $s_1$ and $s_2$.

The second control register 26 is coupled to a second control line 60. The ten respective first output control circuits 54 are coupled by ten respective lines 62 (only two of which are shown) to the second control line 60, and the six second output control circuits 58 are coupled by six respective lines 64 (only two of which are shown) to the second control line 60.

Six input register circuits 66 (only two of which are shown) are coupled by respective input lines 68 (only two of which are shown) to respective lines 48, each separate input line 68 being coupled to a respective separate lane 48. Each input register circuit 66, in turn, is coupled by a respective line 70 to one of six input multiplexers 72 (only two of which are shown). The six input multiplexers 72 are coupled by six respective feedback lines 74 (only two of which are shown) to respective lines 90' within respective second macrocell units 32 as will be discussed more fully below. The first control register 24 is coupled to first control line 76, and each of the six input multiplexers 72 is coupled to the first control line 76 by one of six respective lines 78

(only two of which are shown). Furthermore, each input multiplexer 72 is coupled to two respective programmable fuse links s₃ and s₄.

Clock signals are provided on clock line 80 to each of the ten first macrocell units 28 to each of the six second macrocell units 32, to the first control register 24, to the second control register 26, and to each of the six input registers 66. Reset signals are provided on reset line 82 to each of the ten first macrocell units 28, to each of the six second macrocell units 32, to the first control register 24, and to the second control register 26.

Figure 1:
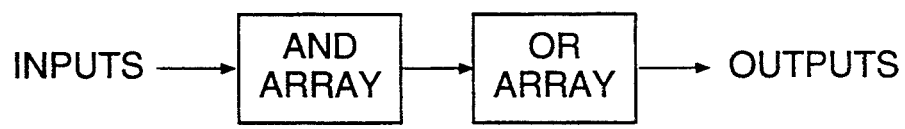
FIG. 1 is a generalized block diagram illustrating an architecture of typical earlier programmable sequencing element devices.
Figure 3:
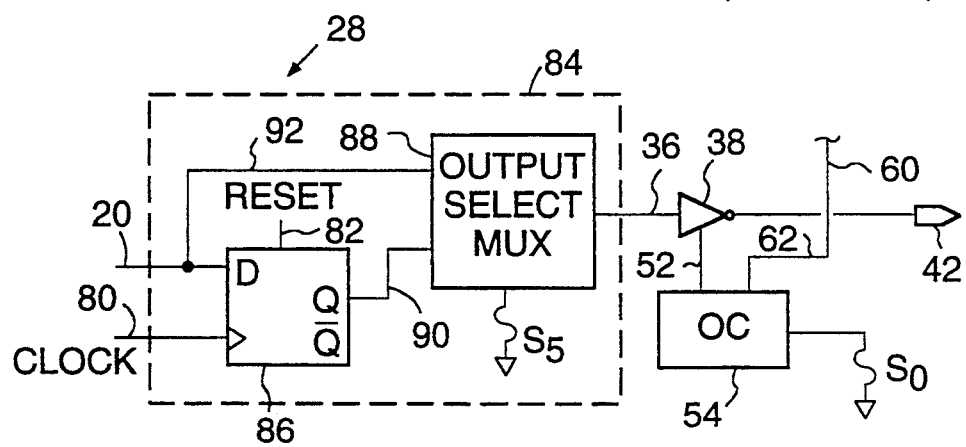
FIG. 3 is a block diagram of a first macrocell unit of the embodiment of FIG. 2.

Referring now to the illustrative drawings of FIG. 3, there are shown within dashed lines 84 details of a representative one of the ten first first macrocell units 28. The representative macrocell unit 28 includes a D-type flip-flop 86, an output select multiplexer 88 and a programmable fuse link labelled s₅. The D-type flip-flop 86 is a registered flip-flop which is coupled to receive clock signals provided on clock line 80. The D terminal of the flip-flop 86 is coupled to a respective output line 20, and the Q terminal of the flip-flop 86 is coupled by line 90 to one input terminal of the output select multiplexer 88. Line 92 couples output line 20 to another input terminal of the output select multiplexer 88. The D-type flip-flop 86 is coupled to receive reset signals provided on reset line 82. The programmable fuse link s₅ is coupled to a programmable input terminal of the output select multiplexer 88. The output select multiplexer 88 provides a selected signal on respective line 36. The remaining details illustrated in FIG. 3 are explained above with respect to FIG. 1 and need not be further described herein.

Figure 4:
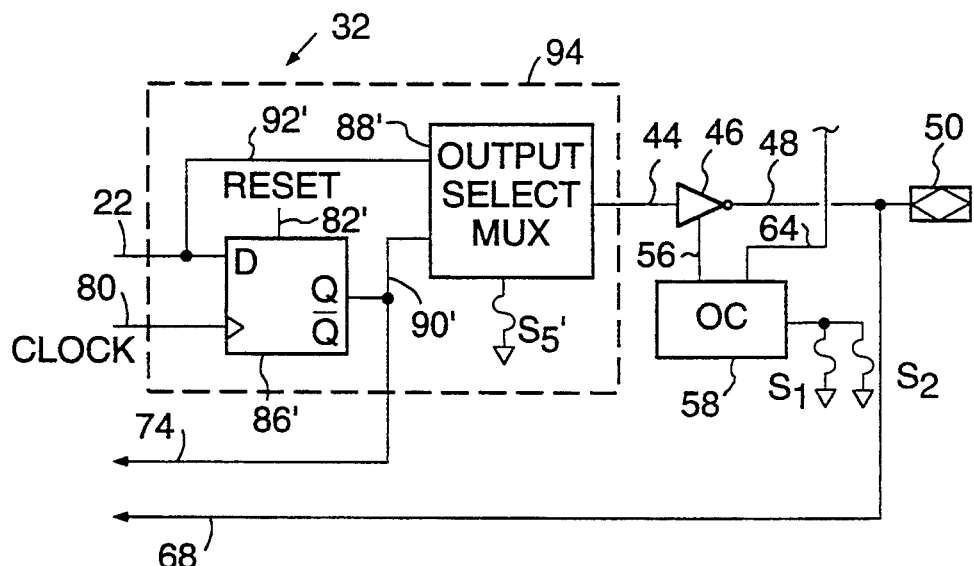
FIG. 4 is a block diagram of a second macrocell unit of the embodiment of FIG. 2.

Referring now to the illustrative drawings of FIG. 4, there are shown within dashed lines 94 details of a representative one of the six second macrocell units 32. Since the first macrocell units 28 and the second macrocell units 32 are identical in many respects, the following description will focus on those features of the representative second macrocell unit 32 which differ substantially from those of the representative first macrocell unit 28. Furthermore, components of the representative second macrocell unit 32 which are substantially identical to those of the first are identified by primed reference numerals identical to those referencing substantially identical components shown in FIG. 3.

More specifically, the D input terminal of registered flip-flop 86' is coupled to a respective output line 22. One of the six respective feedback lines 74 is coupled to line 90' which is coupled between the Q output terminal of the D flip-flop 86' and an input terminal of the output select multiplexer 88'. The output select multiplexer 88' provides a selected signal on respective line 44. Furthermore, one of the respective six input lines 68 is coupled to line 48.

In operation, the PROM 12 receives six binary first signals on its six input terminal lines 14 and provides eighteen binary second signals on its eighteen output terminal lines 16, 18, 20 and 22. The six binary first signals comprise binary address signals used to address the sixty-four memory locations of the PROM 12, and the eighteen output lines 16, 18, 20 and 22 provide binary output signals corresponding to an eighteen-bit binary word stored at an addressed memory location of the PROM 12. As will be more fully explained below, the apparatus of the first embodiment 10 includes a variable output terminal structure and can provide from one to sixteen output signals on its respective terminals 42 and 50. Furthermore, the apparatus advantageously can be programmed either statically, so as to always provide a fixed number of output signals on its sixteen terminals 42 and 50; or dynamically so that the number of terminals 42 or 50 dedicated to providing output signals selectively can be varied.

Additionally, individual respective first and second macrocell units 28 and 32 can be programmed so as to provide either combinatorial or registered signals on their respective lines 36 and 44.

Finally, the respective input multiplexers 72 can be programmed to select either feedback signals provided by corresponding respective second macrocell units 32 on their respective lines 90' and feedback lines 74 or to select input signals provided to corresponding respective second terminals 50 for provision on respective input lines 68 to respective input registers 66. The selected signals are provided as first signals on respective input terminal lines 14. Each respective input multiplexer 72 can be programmed statically so as to always select a particular one of the two signals provided to it for provision on to the PROM 12 on a respective line 14. Alternatively, an input multiplexer 72 can be programmed dynamically so that either an input signal or feedback signal can be selected for provision on a respective line 14, and so that the selection can be changed.

Referring once again to the drawings of FIG. 3, the first output control circuit 54 provides signals on line 52 which control the operation of the first output buffer circuit 38. The first output control circuit 54, in turn, is controlled in its operation by the status of programmable fuse link s₀ and by control signals provided by the second control register 26 on second control line 60 and respective line 62. The signals provided on line 52 cause the first output buffer circuit 38 to be either enabled or disabled. When the first output buffer circuit 38 is enabled, signals which are selected by the output select multiplexer 88 and provided on line 36, are provided by the first buffer circuit 38 to the respective first terminal 42. When the first buffer circuit 38 is disabled, however, it substantially prevents signals selected by the output select multiplexer 88 from being provided to the respective first terminal 42.

Table 1 below summarizes the operation of the representative first output buffer circuit 38 in response to the status of the fuse link s₀ and the logic level of the control signal provided on second control line 60 and respective line 62.

TABLE 1

| Control Signal Logic Level | S₀ Fuse Status | Status of First Output Buffer |
|---|---|---|
| 0 | Not Blown | Disabled (Dynamic) |
| 1 | Not Blown | Enabled (Dynamic) |
| X | Blown | Enabled (Static) |

Thus, through the use of ten respective first output control circuits 54, which for example can be relatively a simple logic circuit which will be appreciated by the those skilled in the art, the availability of each of ten of the sixteen output signals provided by the PROM 12 can be individually controlled in a manner summarized in Table 1 above. Furthermore, the availability of each of the ten output signals can be permanently programmed on an individual basis in a static fashion by blowing a respective fuse link s₀. Alternatively, the availability can be programmed in a dynamic fashion by not blowing the respective fuse link s₀ and by programming the OR-array (not shown) internal to the PROM 12 to provide signals on output line 18 to the second control register 26 and ultimately to lines 60 and 62 which control the respective first output control circuits 54 which, an turn, control availability of output signals on respective first terminals 42.

Referring to the drawings of FIG. 4, the second output control circuit 58 provides signals on line 56 which control the operation of the second output buffer circuit 46. The second output control circuit 58, in turn, is controlled in its operation by the status of programmable fuse links $s_1$ and $s_2$ and by the logic level of control signals provided by the second control register 26 on second control line 60 and respective line 64. The signals provided on line 56 cause the second output buffer circuit 46 to be either enabled or disabled. When the second output buffer circuit 46 is enabled, signals which are selected by the output select multiplexer 88' and provided on line 44 are provided by the second buffer circuit 46 to the respective second terminal 50. When the second buffer circuit 46 is disabled, however, it substantially prevents signals selected by the output select multiplexer 88' from being provided to the respective second terminal 50. It will be appreciated that when the second output buffer circuit 46 is disabled, input signals received by second terminal 50 can be provided via respective lines 48 and 68 to a corresponding input register 66 and ultimately to a respective input multiplexer 72. Thus, second terminal 50 can either provide output signals or receive input signals depending upon whether a corresponding second output buffer circuit 46 is enabled or disabled.

Table 2 below summarizes the operation of the representative second output buffer circuit 56 in response to the status of the fuse links $s_1$ and $s_2$ and the logic level of the control signal provided on second control line 60 and respective line 64.

In Table 2, the following symbols are used: X=Don't Care, NB=Not Blown, B=Blown, D=Disabled, E=Enabled, d=dynamically and s=statically.

TABLE 2

| Control Signal | Fuse Status | | Status of First |
|---|---|---|---|
| Logic Level | $s_1$ | $s_2$ | Output Buffer |
| 0 | NB | NB | D - d |
| 1 | NB | NB | E - d |
| X | B | B | E - s |
| X | NB | B | D - s |

Thus, the availability of the remaining six of the sixteen output signals provided by the PROM 12 can be individually controlled. Each of these six output signals can be permanently programmed on an individual basis by either blowing or not blowing fuses $s_1$ or $s_2$ as indicated in Table 2. Alternatively, each can be programmed in a dynamic fashion by not blowing the fuse links $s_1$ and $s_2$ and by programming the OR-array (not shown) internal to the PROM 12 to provide signals on output line 18 to the second control register 26 and ultimately to lines 60 and 64 which control the respective second output control circuits 58 and second output buffer circuits 46 in a desired manner.

Referring now to both FIGS. 3 and 4, it will be appreciated that the respective output select multiplexers 88 and 88' of the representative first and second macrocell units 28 and 32 can be statically programmed to select signals on either respective lines 90, 92 or respective lines 90' and 92' by either blowing or not blowing respective fuses $s_5$ and $s_5'$.

Table 3 below summarizes the operation of each respective input multiplexer 72 in response to the status of fuse links $s_3$ and $s_4$ and the logic level of a control signal provided on first control line 76 by first control register 24. Each respective input multiplexer 72 can be programmed either statically or dynamically to select either respective external input address signals provided on a respective line 68 via a respective input register 66 or to select feedback address signals provided on a respective line 74 from a respective second macrocell unit 32. Of course, some of the input multiplexers 72 can be programmed to select feedback signals while others are programmed to select external input signals.

The following symbols apply to Table 3: I=input signal on line 68, F=feedback signal on line 74, d=dynamic, s=static, B=blown and NB=not blown.

TABLE 3

| Control Signal | Fuse Status | | Selected |
|---|---|---|---|
| Logic Level | $s_3$ | $s_4$ | Input |
| X | B | B | I - s |
| X | NB | B | F - s |
| 0 | NB | NB | I - d |
| 1 | NB | NB | F - d |

The integrated circuit programmable logic element apparatus of the first embodiment 10, therefore, alternatively can select either feedback address signals or external input address signals or a combination of both as signals to be received by first input terminal lines 14 of its PROM 12 without the need to sacrifice permanent reduction in the number of PROM terminals available to receive external input signals. The apparatus of the first embodiment 10 advantageously achieves this result through the use of programmable input multiplexers 72 which can receive feedback address signals provided by corresponding second macrocell units 32 and which can receive external input address signals provided to corresponding second terminals 50. Thus the first embodiment 10 can function efficiently as a state machine in which state information alternatively can be fed back from the PROM 12 or provided from external inputs or by a combination of both.

Figure 5:
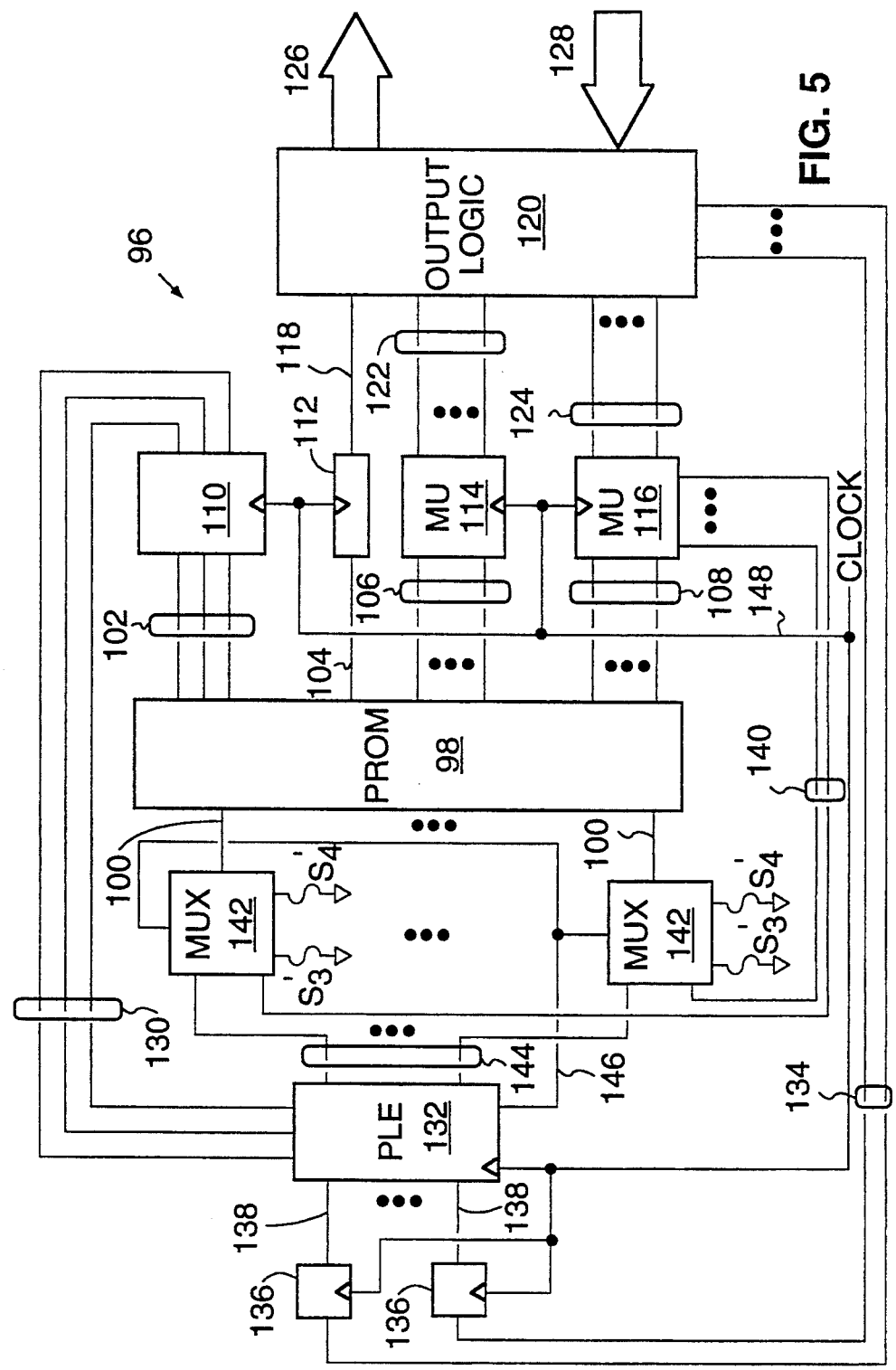
FIG. 5 is a block diagram of a second embodiment of the invention.

Referring now to the illustrative drawings of FIG. 5, there is shown a second embodiment 96 of the apparatus of the present invention. The apparatus of the second embodiment 96 includes a 64×20 PROM 98 including six input terminal lines 100 (only two of which are shown) and twenty output terminal lines labelled 102, 104, 106 and 108. A first set of three output terminal lines are coupled to a third control register 110. Output terminal line 104 is coupled to a fourth control register 112. Ten output control lines 106 (only two of which are shown) are coupled to a ten-cell macrocell unit 114, and six output lines 108 (only two of which are shown) are coupled to a six-cell macrocell unit 116.

The fourth control register 112 is coupled by line 118 to an output logic circuit 120. The ten-cell macrocell unit 114 is coupled by ten respective lines 122 (only two of which are shown) to the output logic circuit 120, and the six-cell macrocell unit 116 is coupled by six respective lines 124 (only two of which are shown) to the output logic circuit 120. The output logic circuit 120 provides up to sixteen output signals represented by the large arrow labelled 126, and it receives up to six input signals represented by the large arrow labelled 128.

The three output lines labelled 102 provide binary control signals to the third control register 110. The third control register 110, in turn, provides binary control signals on three control lines 130 to a programmable sequencing element array 132. The array 132 is a programmable array logic device. However, it will be appreciated that other types of programmable sequencing elements, such as a PROM, can be used instead. Each respective line 124 is coupled to one of six respective input lines 134 which are respectively coupled to six input registers 136 (only two of which are shown). The respective input registers 136 are coupled by respective lines 138 to the array 132.

Six feedback lines 140 (only two of which are shown) couple the six-cell macrocell unit 116 to six respective input multiplexers 142 (only two of which are shown). The programmable sequencing element array 132 is respectively coupled to each input multiplexer 142 by a respective line 144. Furthermore, each respective input multiplexer 144 is coupled to two respective fuse links labelled s3' and s4'. The array 132, moreover, is coupled to each respective input multiplexer 142 by an array control line 146. Finally, clock pulse signals are provided as shown on clock line 148. It will be appreciated that reset signals can be provided to the apparatus of the second embodiment 96 by appropriate lines (not shown).

The fourth control register 112, of the second embodiment 96 shown in FIG. 5, substantially corresponds to the second control register 26 of the first embodiment 10 of FIG. 2 and is substantially identical thereto. The ten-cell macrocell unit 114 is substantially identical to the circuitry enclosed within dashed lines 30 of FIG. 2, and the six-cell macrocell unit 116 is substantially identical to the circuitry within dashed lines 34 of FIG. 2. Furthermore, the output logic circuit 120 of the second embodiment 96 is substantially identical to the respective first and second output buffer circuits 38 and 46 and the respective first and second output control circuits 54 and 58 of the first embodiment 10 shown in FIG. 2 and the components associated therewith. Thus, it will be appreciated that the large arrow 126 represents up to sixteen output signals, and that the large arrow 128 represents up to six input signals, depending upon the programming of the output logic circuit 120.

The operation of the apparatus of the second embodiment 96 differs from that of the first embodiment 10 in that the programmable sequencing element array 132 is programmed to generate on lines 144 binary address signals for provision to respective input multiplexers 142, and to generate on line 146 control signals for dynamically controlling the respective input multiplexers 142.

Table 4 summarizes the operation of the respective input multiplexers 142. The following symbols apply to Table 4: I=signal on line 144, F=feedback signal on line 140, d=dynamic, s=static, B-blown and NB-not blown.

TABLE 4

| Control Signal Logic Level | Fuse Status s3' | s4' | Selected Input |
| --- | --- | --- | --- |
| X | B | B | I - s |
| X | NB | B | F - s |
| 0 | NB | NB | I - d |
| 1 | NB | NB | F - d |

Thus, it will be understood that the apparatus of the second embodiment 96 advantageously can function as an improved state machine which can simultaneously test multiple conditions and provide multiple branching. For example, the PROM 98 can be programmed such that binary control signals provided on control lines 130 serve as opcodes which can take on up to $2^3$ different bit pattern combinations. These $2^3$-bit patterns can be used in conjunction with the external input signals provided on lines 134 to generate address signals on lines 144 which in combination represent branch addresses (memory locations of the PROM 98 addressed by a combination of binary signals provided on lines 100).

More specifically, since there are a total nine signals provided to the programmable sequencing element array 132 (three control signals and six external input signals), and there are only six first input terminal lines 100 for the PROM 98, the memory array 132 provides the capability of transitioning to either of at least two possible branch addresses (memory locations) of the PROM 98 based upon a combination of external input signals provided on respective lines 134; thus, there is a possibility of flexible multiple branching to more than one PROM branch address (memory location) based upon a combination of input signals provided on lines 134.

Table 5, which follows, shows an illustrative example of the programming of the programmable sequencing element array 132 to achieve flexible multiple branching and to achieve simultaneous testing of multiple test conditions. In Table 5, the control signals represent combinations of binary control signals provided on lines 130. The test conditions illustrate the conditions tested, where A through F represent logic levels of signals on the six respective input lines 134. A*B represents the logical AND operation, and for example, $\overline{F}$ represents a logical complement of F. The generated branch address represents an address location of the PROM 98 addressed by a combination of binary signals generated by the array 132 on lines 144 in response to the illustrated corresponding control signals and test conditions.

TABLE 5

| Control Signals | Test Condition | Generated Branch Address |
| --- | --- | --- |
| 001 | If (A*B*C) = 1 | Then go to location 20 |
| 010 | If (A*B*C) = 1 | Then go to location 30 |
| 011 | If (A*C) = 1 | Then go to location 20 |
| 100 | If ((D*E*$\overline{F}$) = 1 and current location = 20) | Then hold location 20, else go to location 50 |

The first two illustrative rows in Table 5, illustrate multiple branching based upon a single combination of external input conditions. The second and third rows illustrate the use of the control signals to achieve conditional branching based upon multiple test conditions such that test condition (A*C)=1 is distinguished from test condition (A*B*C)=1. Finally, the last illustrative row illustrates the use of the array 132 to hold an address location of the PROM 98 until a particular condition, (D*E*$\overline{F}$)=1, is no longer true, and then to go to another address location of the PROM 98. Thus, the apparatus of the second embodiment 96, through the use of the programmable sequencing element array 132, advantageously permits multiple branching from a given combination of external input conditions and permits the simultaneous testing of multiple input conditions.

Figure 6:
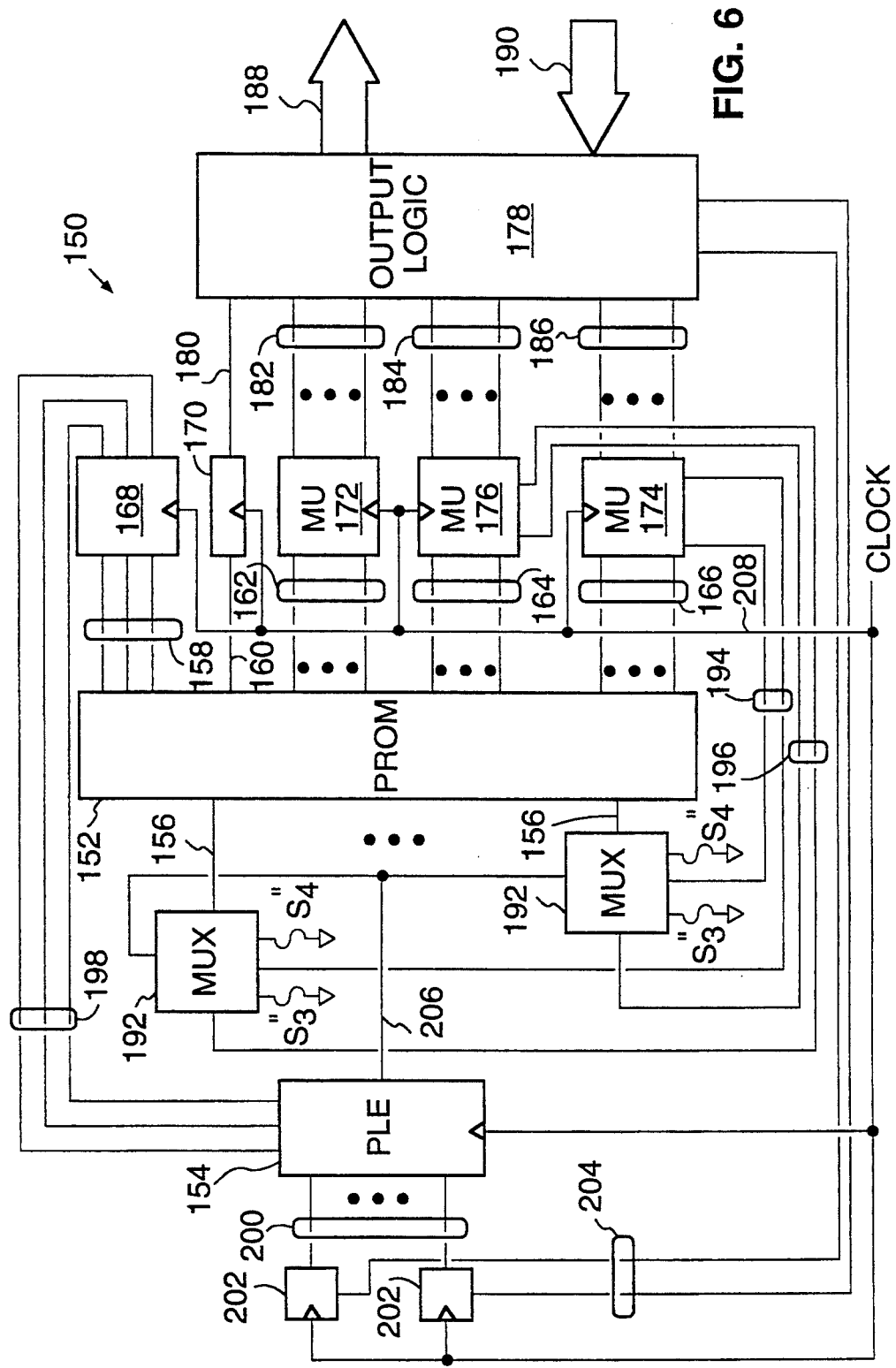
FIG. 6 is a block diagram of a third embodiment of the invention.

FIG. 6 illustrates a third embodiment 150 of the apparatus of the present invention. The third embodiment 150 includes a 64×26 PROM 152 and a programmable sequencing element array 154. The PROM 152 includes six input terminal lines 156 and twenty-six output terminal lines labelled 158, 160, 162, 164, and 166. A first set of three output terminal lines 158 are coupled to a fifth control register 168. Output terminal line 160 is coupled to a sixth control register 170. Ten output control lines 162 (only two of which are shown) are coupled to a ten-cell macrocell unit 172. Six output lines 166 (only two of which are shown) are coupled to a first six-cell macrocell unit 174, and six output terminal lines 164 (only two of which are shown) are coupled to a second six-cell macrocell unit 176.

An output logic circuit 178 is coupled by line 180 to the sixth control register 170. The output logic circuit 178 is coupled by ten respective lines 182 (only two of which are shown) to the ten-cell macrocell unit 172. The respective first and second six-cell macrocell units 174 and 176 are coupled by six respective lines 184 and 186 (only two of which are shown) to the output logic circuit 178.

The output logic circuit 178 and the components coupled thereto between the circuit 178 and the PROM 152 are substantially identical to corresponding components of the second embodiment 96 except for the provision of the second six-cell macrocell unit 176 and output circuitry (internal to the output logic circuit 178) associated with it. The first and second macrocell units 174 and 176, respectively, are substantially identical to one another and are substantially identical to the six-cell macrocell unit 116 of the second embodiment 96. The second six-cell macrocell unit 176, however, as will be more fully explained below, is not coupled to provide external input signals to the PROM 152. Furthermore, the output logic circuit 178 of the third embodiment 150 is substantially identical to that of the second embodiment 96 except for the inclusion of extra logic circuitry (not shown) needed to handle signals provided on lines 184 by the second six-cell macrocell unit 176. Thus, it will be appreciated that the third embodiment 150 can provide up to twenty-two output signals represented by the large arrow labelled 188 and can receive up to six external input signals represented by the large arrow 190.

Six respective input multiplexers 192 are respectively coupled to input terminal lines 156. Each respective multiplexer 192 is coupled to two respective fuse links s3" and s4". Furthermore, the respective first six-cell macrocell unit 174 is individually coupled to each respective input multiplexer 192 by one of six respective feedback lines 194 (only two of which are shown), and the respective second six-cell macrocell unit 176 also is individually coupled to each respective input multiplexer 192, by one of six respective feedback lines 196 (only two of which are shown).

The programmable sequencing element array 154 is coupled by three respective lines 198 to the fifth control register circuit 168, and it is respectively coupled by six respective lines 200 (only two of which are shown) to six individual input registers 202 (only two of which are shown). The respective input registers 202 are coupled by six respective input lines 204 (only two of which are shown) to respective lines 186. The programmable sequencing element array 154 provides on line 206 control signals to the respective multiplexers 192.

Finally, clock signals are provided as shown on clock line 208 to various components of the third embodiment 150. It will be appreciated that reset signals can be provided to the apparatus of the third embodiment 150 by appropriate lines (not shown).

Table 6 below summarizes the operation of the respective input multiplexers 192. The following symbols apply to Table 6: F1=feedback signal on line 194, F2=feedback signal on line 196, d=dynamic, s=static, B=blown and NB=not blown.

TABLE 6

| Control Signal Logic Level | Fuse Status $s_3''$ | $s_4''$ | Selected Input |
|---|---|---|---|
| X | B | B | F1 - s |
| X | NB | B | F2 - s |
| 0 | NB | NB | F1 - d |
| 1 | NB | NB | F2 - d |

It will be appreciated that the apparatus of the third embodiment 150, like that of the second embodiment 96, can implement a flexible state machine which can achieve multiple branching and which can simultaneously test multiple test conditions. Moreover, the programmable sequencing element array 154, of the third embodiment 150, similar to that of the second embodiment 96, is programmed to generate signals in response to control signals (provided on lines 198) and external input signals (provided on lines 200).

However, unlike the apparatus of the second embodiment 96, the programmable sequencing element array 154 of the third embodiment 150 does not generate branch address signals. Rather, the PROM 152 of the third embodiment 150 is programmed to provide on its respective output terminal lines 164 and 166 respective feedback signals which serve as alternative branch address signals. The individual respective alternative first and second feedback (branch address) signals are provided to the respective first and second six-cell macrocell units 174 and 176 and ultimately to the input multiplexers 192. The programmable sequencing element array 154 is programmed to provide on line 206 control signals which can control the selection by the respective multiplexers 192 of either respective first or second feedback signals on lines 194 or 196 for provision to respective first input terminal lines 156 as described in Table 6 above. Thus, in the apparatus of the third embodiment 150, alternative branch address signals are stored in the PROM 152, and the programmable sequencing element array 154 is programmed to provide on line 206 control signals which cause respective multiplexers 192 to select between these respective alternative branch address signals.

The overall operation of the apparatus of the third embodiment 150 will be appreciated from the discussion above pertaining to the respective first and second embodiments 10 and 96 and need not be set forth in detail herein.

Figure 7:
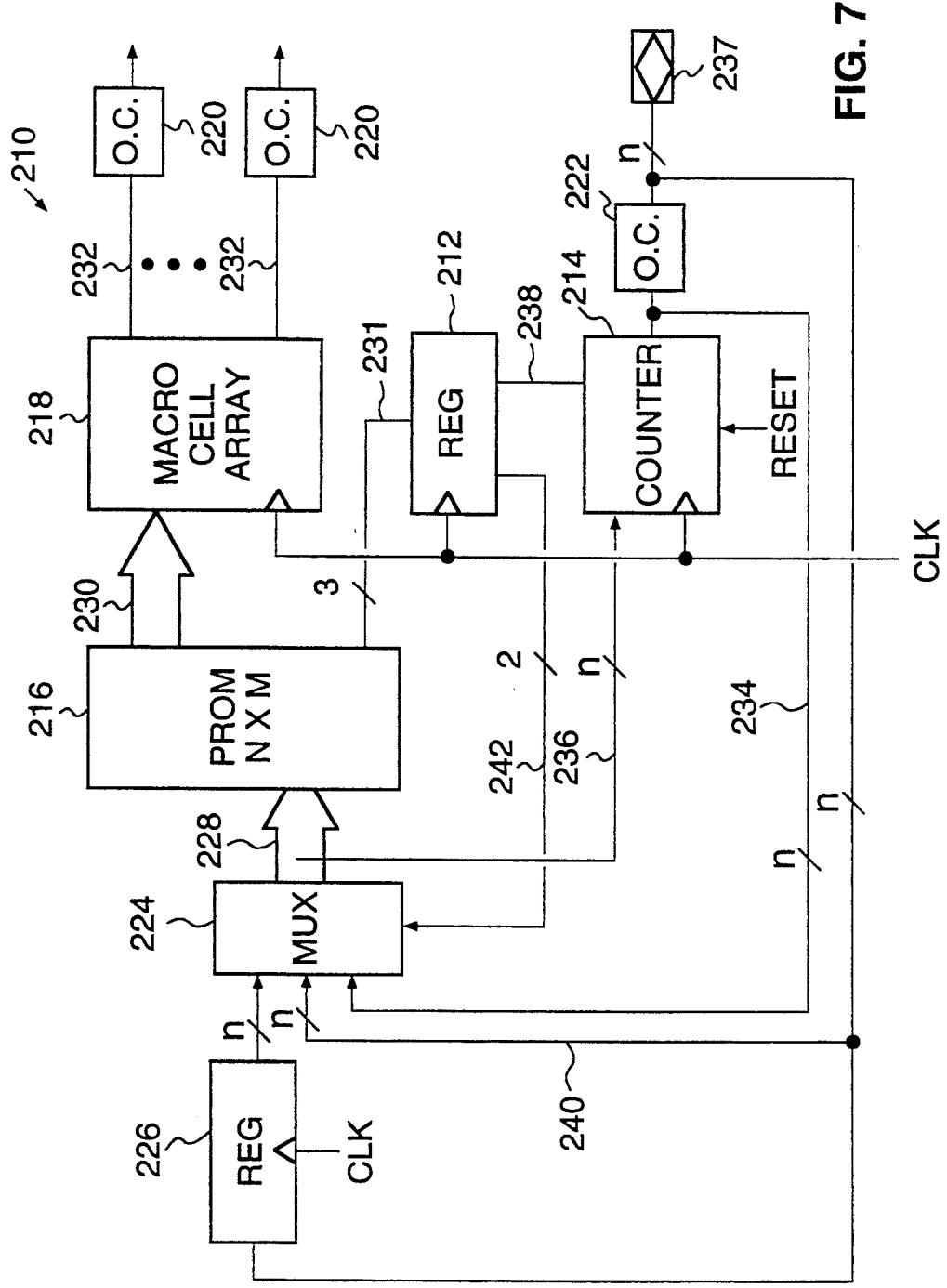
FIG. 7 is a block diagram of a fourth embodiment of the invention.

Referring now to the illustrative drawings of FIG. 7, there is shown a generalized block diagram of a fourth embodiment 210 of the present invention. It will be appreciated that the fourth embodiment 210 is generally similar to the second embodiment 10 illustrated in FIG. 2 except for the addition of feedback control register 212 and counter 214 and for some additional details which will become apparent from the discussion which follows. Thus, the following description of the fourth embodiment 210 and its operation focuses primarily upon the operation of the feedback control register 212 and the counter 214.

The fourth embodiment 210 includes a PROM 216, an output macrocell array 218, a plurality of respective first output control circuits 220 (only two of which are shown) and a plurality of respective second output control circuits 222 (only one of which are shown), an input multiplexer 224 and a plurality of input registers 226 (only one of which is shown) all connected as shown. The PROM 216, for example, can be an $N \times M$ array which receives n first signals indicated by an arrow labelled 228; where $2^n = N$; and provides M second signals indicated by an arrow 230 and by three control lines indicated by the line 231 coupling the PROM 216 with the feedback control register 212. The macrocell array 218 includes a plurality of macrocell units (not shown) which provide on respective lines 232 $(M-3)$ signals to respective first output control circuits 220. The respective signals provided by the macrocell array 218 on respective lines 232 correspond to $(M-3)$ second signals provided by the PROM 216 indicated by arrow 230.

The counter 214 provides n respective feedback address signals to the input multiplexer 224 as indicated by line 234. The counter 214 also is coupled to receive n selected signals from the input multiplexer 224 as indicated by line 236. Furthermore, the counter 214 is coupled to receive at least one Reset signal. Finally, the counter receives a control signal on line 238 from the feedback control register 212.

The input multiplexer 224 is coupled to receive three sets of combinations of n address signals. One set of address signals comprises the n feedback signals provided by the counter 214 as indicated by line 234. The other two sets of combinations of n address signal comprise externally generated input signals provided to respective input terminals 237 (only one of which is shown) of the fourth embodiment 210 from an external circuit (not shown). One combination of n externally generated input signals is provided directly to the input multiplexer 234 as indicated by line 240. These signals, for example, may be selected by the multiplexer 224 when the terminals 227 are coupled to an external circuit using the same clock as the fourth embodiment 210. Another combination of externally generated input signals are respectively provided to the n respective input registers 226. These signals, for example, may be selected by the multiplexer 224 when the terminals 237 are coupled to an external circuit not using the same clock as the fourth embodiment 210.

In operation, the feedback control register 212 provides to the input multiplexer 224 two control signals indicated by line 242 which determine which combination of n address signals will be selected by the input multiplexer for provision to the PROM 216 as first signals.

The feedback control register 212, the counter 214 and the macrocell array 218 as well as the respective input register 226 are clocked by a common clock signal. During one clock cycle, for example, the counter provides a combination of n address signals to the input multiplexer 224 which correspond to a first address location. During a next clock cycle, for example, the counter 214 provides a combination of n address signals in which the combination has been incremented such that the n address signals now correspond to a second address location of the PROM 216. Thus, the counter 214 advantageously permits the provision of a sequence of address signal combinations to the input multiplexer 224 which, when provided to the PROM 216, cause the PROM 216 to address a sequence of address locations of the PROM 216.

A control signal provided by the feedback control register 212 on line 238 can cause the counter 214 to load itself with a combination of n signals selected for provision to the PROM 216 by the input multiplexer 224. The counter 214 then, in a subsequent clock cycle, can provide to the input multiplexer 224 a combination of n address signals which correspond to an incremented version of the combination of n selected signals previously loaded into the counter 214.

Thus, the counter 214 provides to the input multiplexer 224 a combination of address signals which, when selected by the input multiplexer 224, can cause the PROM 216 to sequentially address a set of address locations of the PROM 216. Upon the provision to the feedback control register 212 of appropriate control signals, the feedback control register 212 provides to the input multiplexer 224 respective signals causing the input multiplexer 224 to select externally generated input signals provided either directly from an external circuit as indicated by line 240 or provided by respective input registers 226.

The PROM 216 then receives a selected combination of address signals which correspond to a branch location outside the sequence being generated by the counter 214. The feedback control register 212 also provides on line 238 a control signal which causes the counter 214 to load a combination of address signals corresponding to the branch location. In a subsequent cycle, the control register 212 causes the input multiplexer 224 once again to select address signals provided by the counter 214. The counter 214 provides an incremented version of the combination of selected signals, which represents a next location in a sequence of address locations starting with the new branch location.

Table 7 illustrates the operation of the fourth embodiment 210 as a state machine which transitions through a sequence of address locations and then branches to a new sequence starting at a branch location. It will be appreciated that respective control signals provided by the feedback control register 212 to the input multiplexer 214 are stored in respective address locations of the PROM 216. Thus, the selection by the input multiplexer 224 between feedback signals provided by the counter 214 and externally generated input signals depends upon the signals provided by the PROM 216 to the feedback control register 212 which, in turn, are provided to the input multiplexer 224.

TABLE 7

| Addressed Location of PROM | Address Signal Combination Selected |
| --- | --- |
| 0 | Counter Feedback |
| 1 | Counter Feedback |
| 2 | External Input |
| . | . |
| . | . |
| Branch | Counter Feedback |
| Branch 1 | Counter Feedback |
| etc. | etc. |

The use of the counter 214 for sequencing advantageously permits the implementation of a narrower PROM 216 because less PROM memory is needed when feedback address signals are generated by the counter 214 than if each combination of address signals had to be stored in the PROM 216.

Therefore, the programmable sequencing element apparatus of the present invention advantageously can implement a flexible state machine capable of testing multiple test conditions during each PROM cycle and capable of flexible multiple branching from one PROM address location to any one of at least two other PROM branch address locations.

It will be understood that the above-described embodiments are merely illustrative of many possible specific embodiments which can represent the principles of the invention. Numerous and varied other arrangements can readily be devised in accordance with these principles without departing from the spirit and scope of the invention. For example, a counter similar to that of the fourth embodiment 210 could be included in circuits similar to those of the respective second and third embodiments 96 and 150 to permit the use of narrower PROMs. Thus, the foregoing description is not intended to limit the invention which is defined by the appended claims in which:

What is claimed is:

1. A programmable integrated circuit comprising:
   a PROM which receives a plurality of n respective PROM address signals and which provides a plurality of m PROM output signals, wherein the PROM stores an addressable set of at least $2^n$ programmably-defined words each having at least m bits, and wherein m is greater than n and the set of m PROM output signals includes at least n first PROM output signals and at least one second PROM output signal;
   external signal means for receiving from an external environment at least one external signal;
   programmable sequencing element (PSE) means, operatively coupled to the external signal means and to the PROM, for providing at least n PSE output signals, said PSE means being responsive to the at least one external signal and to the at least one second PROM output signal such that the n PSE output signals constitute a programmably-defined function of one or both of the at least one external signal and the at least one second PROM output signal; and
   selection means, coupled to the PROM to receive the at least n first PROM output signals and coupled to the PSE means to receive the at least n PSE output signals, for selecting n signals each from a respective one or the other of the received at least n first PROM output signals and the received at least n PSE output signals, and for providing the selected n signals to the PROM as the respective n-bit PROM address signals.

2. The integrated circuit of claim 1 wherein said at least one programmable sequencing element means includes a PROM.

3. The integrated circuit of claim 1 wherein said at least one programmable sequencing element means includes a programmable array logic device.

4. The integrated circuit of claim 1 wherein the external signal means further includes:
   storage means for storing the at least one external signal and for supplying the stored external signal to the programmable sequencing element (PSE) means.

5. The integrated circuit of claim 1 wherein the external signal means further includes:
   at least one first register, responsive to a supplied clock signal, for storing the at least one external signal in synchronism with the clock signal and for supplying the stored external signal to the programmable sequencing element (PSE) means.

6. The integrated circuit of claim 1 and further including:
   output storage means for storing the at least n first PROM output signals and for supplying the stored n first PROM output signals to the selection means.

7. The integrated circuit of claim 1 and further including:
   at least one output register, responsive to a supplied clock signal, for storing the at least n first PROM output signals in synchronism with the clock signal and for supplying the stored n first PROM output signals to the selection means.

8. The integrated circuit of claim 1 and further including:
   first macrocell means for providing the at least n first PROM output signals to said selection means wherein the macrocell means includes programmable output means for outputting a programmably-selectable one or more of the at least n first PROM output signals out of said integrated circuit.

9. The integrated circuit of claim 1 and further including:
   first storage means for storing the at least one external signal; and
   first feedback means for providing the at least n first PROM output signals to said selection means.

10. The integrated circuit of claim 1 and further including:
    first storage means for storing the at least one external signal;
    first output storage means for storing the at least n first PROM output signals and for providing stored versions of the at least n first PROM output signals to the programmable sequencing element (PSE) means; and
    programmable output selection means for programmably selecting among the at least n first PROM output signals and the stored versions of the at least n first PROM output signals as signals to be output from said integrated circuit.

11. The integrated circuit of claim 1 wherein:
    said external signal means includes programmable direction control means, coupled to the external environment for programmably and alternatively outputting at least one of the at least n first PROM output signals to the external environment or receiving the at least one external signal from the external environment.

12. The integrated circuit of claim 1 and further including:
    feedback means for providing to said PSE means the at least one second PROM output signal.

13. The integrated circuit of claim 1 and further including:
    output storage means for storing the at least one second PROM output signal; and
    feedback means for providing to said PSE means the stored at least one second PROM output signal.

14. The integrated circuit of claim 1 and further including:

first storage means for storing the at least one external signal;

first output storage means for storing the at least n first PROM output signals and for providing stored versions of the at least n first output signals to the programmable sequencing element (PSE) means; and second output storage means for storing the at least one second PROM output signal and for providing a stored version of the at least one second PROM output signal to the programmable sequencing element (PSE) means.

15. The integrated circuit of claim 1 and further including:

storage means for storing the at least one external signal;

output storage means for storing the at least n first PROM output signals and for providing stored versions of the at least n first PROM output signals to the programmable sequencing element (PSE) means;

output selection means for selecting between the at least n first PROM output signals and the stored versions of the at least n first PROM output signal.

16. An integrated circuit comprising:

a PROM which receives respective n-bit PROM address signals and which provides a plurality of M PROM output signals including at least n first PROM output signals, M being greater than n;

external signal means for receiving from an external environment at least one external signal;

programmable sequencing element (PSE) means for providing at least n PSE output signals, said PSE means being responsive to at least one stored version of the at least n first PROM output signals;

selection means, coupled to the PROM and to the PSE means, for selecting the respective n-bit PROM address signals from among the at least n first PROM output signals and the at least n PSE signals;

output storage means for storing the at least n first PROM output signals and for providing stored versions of the at least n first PROM output signals to the programmable sequencing element (PSE) means;

output selection means for selecting between the at least n first PROM output signals and the stored versions of the at least n first PROM output signals; and feedback means for providing the stored versions of the at least n first PROM output signals to said selection means;

wherein said external signal means, alternatively, provides to the external environment a programmably-selected one or more of the at least n first PROM output signals or provides to the external environment a programmably-selected one or more of the stored versions of the at least n first PROM output signals or receives from the external environment the at least n external signals.

17. The integrated circuit of claim 16 wherein:

said PSE means is responsive to at least one of the plurality of M PROM output signals other than said n first PROM output signals, to which said PSE means is said at least one other signal defining an at least one control signal; and said integrated circuit further comprises output storage means for storing the at least one control signal.

18. The integrated circuit of claim 16 and further including:

feedback means for providing to said selection means the more than n first PROM output signals.

19. The integrated circuit of claim 16 and further including:

storage means for storing the at least one external signal;

output storage means for storing the more than n first PROM output signals and for providing stored versions of the more than n first PROM output signals; and output selection means for selecting among the more than n first PROM output signals and the stored versions of the more than n first PROM output signals.

20. The integrated circuit of claim 16 wherein:

the at least one of the plurality of PROM output signals to which said PSE means is responsive includes at least one control signal; and said integrated circuit further comprises output storage means for storing the at least one control signal.

21. The integrated circuit of claim 16 wherein said PROM provides at least 2 n first PROM output signals; and wherein said external signal means receives at least n external signal.

22. An integrated circuit comprising:

a PROM which receives respective n-bit PROM address signals and which provides a plurality of M PROM output signals including at least n first PROM output signals and at least one control signal;

external signal means for alternatively receiving from an external environment at least one external signal or providing to the external environment the at least n first PROM output signals;

programmable sequencing element (PSE) means for providing at least n PSE output signals, said PSE means being responsive to the at least one control signal;

storage means for storing the at least one external signal;

first output storage means for storing the at least n first PROM output signals;

second output storage means for storing the at least one control signal; and selection means, coupled to the PROM and to the PSE means, for selecting the respective n-bit PROM address signals from among the at least n first PROM output signals and the at least n PSE signals.

23. The integrated circuit of claim 2 wherein said programmable sequencing element means includes a PROM.

24. The integrated circuit of claim 22 wherein said programmable sequencing element means includes a programmable array logic device.

25. An integrated circuit comprising:

a PROM which receives respective n-bit PROM address signals and which provides a plurality of M PROM output signals;

external signal means for receiving respective at least n-bit external signals from an external environment;

storage means for storing the respective at least n-bit external signals and for providing stored versions of the respective at least n-bit external signals;

address counter means for incrementing respective n-bit counter signals to produce respective n-bit incremented counter signals; and selection means, coupled to the PROM and to the storage means and to the address counter means, for selecting the respective n-bit PROM address signals from among the respective incremented counter signals, the respective at least n-bit external signals, and the stored versions of the at least n-bit external signals;

wherein said counter means receives a respective n-bit PROM address signal selected by said selection means and produces respective incremented versions of the selected respective n-bit PROM address signal as the respective incremented counter signals.

26. The integrated circuit of claim 25 wherein the plurality of M PROM output signals include at least one control signal and said selection means responsive to the at least one control signal.

27. The integrated circuit of claim 25 wherein the plurality of M PROM output signals include at least one control signal and said counter means is responsive to the at least one control signal.

28. The integrated circuit of claim 25 wherein the plurality of PROM output signals include multiple control signals; and said selection means and said counter means are respectively responsive to respective control signals.

* * * * *